United States Patent
Zalmanovitch et al.

(10) Patent No.: US 11,223,549 B2
(45) Date of Patent: *Jan. 11, 2022

(54) MANAGING DATA TRANSFERS OVER NETWORK CONNECTIONS BASED ON PRIORITY AND A DATA USAGE PLAN

(71) Applicant: Microsoft Technology Licensing, LLC, Redmond, WA (US)

(72) Inventors: Gil Zalmanovitch, Seattle, WA (US); Gregory James Scott, Seattle, WA (US); Shai Guday, Redmond, PA (US); Alec Garvin Kwok, Redmond, WA (US); Yue Jiang, Redmond, WA (US); Kenneth Vincent Ma, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,094

(22) Filed: Jan. 19, 2018

(65) Prior Publication Data

US 2018/0145896 A1    May 24, 2018

Related U.S. Application Data

(63) Continuation of application No. 13/721,066, filed on Dec. 20, 2012, now Pat. No. 9,900,231.
(Continued)

(51) Int. Cl.
*H04L 12/26* (2006.01)
*H04W 8/18* (2009.01)
(Continued)

(52) U.S. Cl.
CPC ...... *H04L 43/0876* (2013.01); *H04L 12/1435* (2013.01); *H04L 43/04* (2013.01);
(Continued)

(58) Field of Classification Search
CPC . H04L 12/6592; H04L 43/0811; H04L 47/41; H04L 47/828; H04L 12/1435;
(Continued)

(56) References Cited

U.S. PATENT DOCUMENTS 5,778,182 A    7/1998  Cathey et al.
6,308,328 B1   10/2001 Bowcutt et al.
(Continued)

FOREIGN PATENT DOCUMENTS

CN         1317745 A      10/2001
CN       101150496 A       3/2008
(Continued)

OTHER PUBLICATIONS

"International Preliminary Report on Patentability Issued in PCT Application No. PCT/US13/022822", dated Aug. 7, 2014, 6 Pages.
(Continued)

*Primary Examiner* — Philip J Chea
*Assistant Examiner* — Ruth Solomon (57) ABSTRACT

Embodiments manage use of different network connections for data transfer in view of priority information and a data usage plan identifying threshold limits associated with the different network connections. A computing device receives data transfer requests from applications executing on the computing device. The data transfer requests have priority information associated therewith. The computing device compares the priority information with available network connections. One or more of the data transfer requests are selected for initiation based on the comparison and on the threshold limits.

20 Claims, 4 Drawing Sheets

Related U.S. Application Data (60) Provisional application No. 61/696,472, filed on Sep. 4, 2012, provisional application No. 61/591,509, filed on Jan. 27, 2012, provisional application No. 61/591,503, filed on Jan. 27, 2012.

(51) Int. Cl.
| | |
|---|---|
| *H04L 12/14* | (2006.01) |
| *H04M 15/00* | (2006.01) |
| *H04W 4/70* | (2018.01) |
| *H04W 4/24* | (2018.01) |
| *H04M 1/725* | (2021.01) |
| *H04W 88/06* | (2009.01) |
| *H04W 4/60* | (2018.01) |
| *H04W 24/02* | (2009.01) |
| *H04M 1/72403* | (2021.01) |

(52) U.S. Cl.
CPC .......... *H04L 43/045* (2013.01); *H04L 43/062* (2013.01); *H04M 15/41* (2013.01); *H04M 15/58* (2013.01); *H04M 15/60* (2013.01); *H04M 15/765* (2013.01); *H04M 15/7652* (2013.01); *H04M 15/80* (2013.01); *H04M 15/83* (2013.01); *H04M 15/84* (2013.01); *H04M 15/846* (2013.01); *H04M 15/85* (2013.01); *H04M 15/853* (2013.01); *H04M 15/854* (2013.01); *H04M 15/86* (2013.01); *H04W 4/24* (2013.01); *H04W 4/60* (2018.02); *H04W 4/70* (2018.02); *H04W 8/186* (2013.01); *H04W 24/02* (2013.01); *H04M 1/72403* (2021.01); *H04M 15/775* (2013.01); *H04M 15/8044* (2013.01); *H04M 15/856* (2013.01); *H04W 8/18* (2013.01); *H04W 88/06* (2013.01)

(58) Field of Classification Search
CPC ..... H04L 43/04; H04L 43/045; H04L 43/062; H04L 43/0876; H04M 15/41; H04M 15/58; H04M 15/60; H04M 15/765; H04M 15/775; H04M 15/80; H04M 15/8044; H04M 15/83; H04M 15/84; H04M 15/846; H04M 15/85; H04M 15/856; H04M 15/853; H04M 15/854; H04M 15/856; H04M 15/86; H04M 1/72403; H04M 1/72522; H04M 15/7652; H04W 24/02; H04W 4/24; H04W 4/60; H04W 4/70; H04W 88/06; H04W 8/18; H04W 8/186; H04W 4/26
See application file for complete search history.

(56) References Cited

U.S. PATENT DOCUMENTS

| | | | |
|---|---|---|---|
| 7,103,740 B1 | 9/2006 | Colgrove et al. | |
| 7,184,749 B2 | 2/2007 | Marsh et al. | |
| 7,277,938 B2 | 10/2007 | Duimovich et al. | |
| 7,320,131 B1 | 1/2008 | O'Toole, Jr. | |
| 7,406,596 B2 | 7/2008 | Tararukhina et al. | |
| 7,418,532 B2 | 8/2008 | Suzuki et al. | |
| 7,532,571 B1 | 5/2009 | Price et al. | |
| 7,720,727 B2 | 5/2010 | Keyes et al. | |
| 7,904,080 B2 | 3/2011 | Atkins et al. | |
| 7,986,935 B1 | 7/2011 | D'Souza et al. | |
| 8,064,876 B2 | 11/2011 | Knight | |
| 8,160,598 B2 | 4/2012 | Savoor | |
| 8,249,904 B1 * | 8/2012 | DeSantis | G06F 9/5088 |
| | | | 705/7.12 |
| 8,255,731 B1 | 8/2012 | Alsina et al. | |
| 8,285,250 B2 * | 10/2012 | Rubin | H04L 47/14 |
| | | | 455/405 |
| 8,359,389 B1 | 1/2013 | Cohen et al. | |
| 8,374,576 B2 | 2/2013 | Bedingfield et al. | |
| 8,407,721 B2 | 3/2013 | Dyba et al. | |
| 8,484,568 B2 | 7/2013 | Rados et al. | |
| 8,542,661 B2 | 9/2013 | Moeller et al. | |
| 8,572,256 B2 | 10/2013 | Babbar et al. | |
| 8,650,325 B2 * | 2/2014 | Sharkey | H04L 69/321 |
| | | | 709/240 |
| 8,689,541 B2 | 4/2014 | McDonald et al. | |
| 8,880,022 B2 | 11/2014 | Agarwal et al. | |
| 8,924,352 B1 | 12/2014 | Andruss et al. | |
| 8,971,841 B2 | 3/2015 | Menezes et al. | |
| 8,977,231 B2 | 3/2015 | Zalmanovitch et al. | |
| 9,049,589 B2 | 6/2015 | Zalmanovitch et al. | |
| 9,154,550 B1 * | 10/2015 | Abgrall | H04L 67/1002 |
| 9,160,790 B1 * | 10/2015 | Abgrall | H04L 67/1002 |
| 9,161,200 B2 | 10/2015 | Guday et al. | |
| 9,264,556 B2 | 2/2016 | Zalmanovitch et al. | |
| 9,544,195 B1 * | 1/2017 | Garg | H04L 47/627 |
| 9,544,212 B2 | 1/2017 | Zalmanovitch et al. | |
| 9,660,889 B2 | 5/2017 | Zalmanovitch et al. | |
| 9,825,830 B2 | 11/2017 | Zalmanovitch et al. | |
| 9,838,287 B2 | 12/2017 | Zalmanovitch et al. | |
| 9,887,894 B2 | 2/2018 | Zalmanovitch et al. | |
| 2002/0029273 A1 | 3/2002 | Haroldson et al. | |
| 2002/0082991 A1 | 6/2002 | Friedman et al. | |
| 2002/0090926 A1 | 7/2002 | Pirkola et al. | |
| 2003/0066055 A1 | 4/2003 | Spivey | |
| 2003/0115385 A1 | 6/2003 | Adamane et al. | |
| 2003/0181242 A1 | 9/2003 | Lee et al. | |
| 2003/0186706 A1 | 10/2003 | Bergins et al. | |
| 2004/0032828 A1 | 2/2004 | Satt et al. | |
| 2004/0040021 A1 | 2/2004 | Bharati et al. | |
| 2004/0111712 A1 | 6/2004 | Humpert et al. | |
| 2004/0153587 A1 | 8/2004 | Choi | |
| 2004/0176965 A1 | 9/2004 | Winch et al. | |
| 2004/0199634 A1 | 10/2004 | Jackowski et al. | |
| 2005/0052992 A1 | 3/2005 | Cloonan et al. | |
| 2005/0238047 A1 | 10/2005 | Holland et al. | |
| 2006/0075467 A1 * | 4/2006 | Sanda | G06F 21/316 |
| | | | 726/1 |
| 2006/0141983 A1 | 6/2006 | Jagannathan et al. | |
| 2006/0211404 A1 | 9/2006 | Cromp et al. | |
| 2006/0277224 A1 | 12/2006 | Aftab et al. | |
| 2007/0060097 A1 * | 3/2007 | Edge | H04L 29/06027 |
| | | | 455/404.1 |
| 2007/0211674 A1 | 9/2007 | Ragnar Karlberg et al. | |
| 2007/0223408 A1 * | 9/2007 | Thielke | H04W 48/18 |
| | | | 370/310 |
| 2007/0294562 A1 | 12/2007 | Takamatsu et al. | |
| 2008/0168245 A1 | 7/2008 | De Atley et al. | |
| 2008/0250083 A1 | 10/2008 | Kovacs et al. | |
| 2008/0270598 A1 | 10/2008 | Chen et al. | |
| 2008/0311912 A1 | 12/2008 | Balasubramanian et al. | |
| 2008/0318621 A1 | 12/2008 | Fan et al. | |
| 2009/0054030 A1 | 2/2009 | Golds | |
| 2009/0068980 A1 | 3/2009 | Creswell et al. | |
| 2009/0068984 A1 | 3/2009 | Burnett | |
| 2009/0081996 A1 | 3/2009 | Duggal et al. | |
| 2009/0138427 A1 | 5/2009 | Kalavade | |
| 2009/0172275 A1 | 7/2009 | Nochimowski et al. | |
| 2009/0196302 A1 | 8/2009 | Pastorino et al. | |
| 2009/0199196 A1 | 8/2009 | Peracha | |
| 2009/0203352 A1 | 8/2009 | Fordon et al. | |
| 2009/0285201 A1 | 11/2009 | Ben-Haim et al. | |
| 2010/0015926 A1 | 1/2010 | Luff | |
| 2010/0017506 A1 | 1/2010 | Fadell | |
| 2010/0035576 A1 | 2/2010 | Jones et al. | |
| 2010/0130163 A1 | 5/2010 | Pousti | |
| 2010/0141009 A1 | 6/2010 | Kirch et al. | |
| 2010/0159948 A1 | 6/2010 | Spivey et al. | |
| 2010/0180190 A1 | 7/2010 | Carroll | |
| 2010/0184440 A1 | 7/2010 | Mao et al. | |
| 2010/0191612 A1 | 7/2010 | Raleigh | |
| 2010/0318647 A1 | 12/2010 | Savoor et al. | |
| 2011/0019566 A1 | 1/2011 | Leemet et al. | |
| 2011/0047620 A1 | 2/2011 | Mahaffey et al. | |

(56) References Cited

U.S. PATENT DOCUMENTS

| | | |
|---|---|---|
| 2011/0070898 A1 | 3/2011 | Sanjeev et al. |
| 2011/0087985 A1 | 4/2011 | Buchanan et al. |
| 2011/0137776 A1 | 6/2011 | Goad et al. |
| 2011/0145920 A1* | 6/2011 | Mahaffey ............... G06F 21/564 726/22 |
| 2011/0151831 A1 | 6/2011 | Pattabiraman |
| 2011/0176482 A1 | 7/2011 | Vizor et al. |
| 2011/0208857 A1 | 8/2011 | Gentile et al. |
| 2011/0211465 A1 | 9/2011 | Farrugia et al. |
| 2011/0231551 A1 | 9/2011 | Hassan et al. |
| 2011/0238826 A1 | 9/2011 | Carre et al. |
| 2011/0244826 A1 | 10/2011 | Krishnan et al. |
| 2011/0275344 A1 | 11/2011 | Momtahan et al. |
| 2011/0276442 A1 | 11/2011 | Momtahan et al. |
| 2011/0276823 A1 | 11/2011 | Ueno et al. |
| 2011/0300865 A1 | 12/2011 | Kashikar et al. |
| 2012/0007248 A1 | 1/2012 | Seong |
| 2012/0023189 A1 | 1/2012 | Giaretta et al. |
| 2012/0054661 A1 | 3/2012 | Rados et al. |
| 2012/0064908 A1 | 3/2012 | Fox et al. |
| 2012/0064923 A1 | 3/2012 | Imes et al. |
| 2012/0072481 A1 | 3/2012 | Nandlall et al. |
| 2012/0101952 A1 | 4/2012 | Raleigh et al. |
| 2012/0108200 A1* | 5/2012 | Rubin ..................... H04L 47/14 455/405 |
| 2012/0117478 A1 | 5/2012 | Vadde et al. |
| 2012/0142310 A1 | 6/2012 | Pugh et al. |
| 2012/0150808 A1 | 6/2012 | Hubner et al. |
| 2012/0155296 A1 | 6/2012 | Kashanian |
| 2012/0158947 A1 | 6/2012 | Hassan et al. |
| 2012/0163232 A1 | 6/2012 | Yoo |
| 2012/0198046 A1* | 8/2012 | Shah ..................... G06Q 30/04 709/224 |
| 2012/0208495 A1 | 8/2012 | Lawson et al. |
| 2012/0215911 A1 | 8/2012 | Raleigh et al. |
| 2012/0276867 A1 | 11/2012 | Mcnamee et al. |
| 2012/0278194 A1 | 11/2012 | Dewan et al. |
| 2012/0290584 A1 | 11/2012 | De Bona et al. |
| 2012/0303823 A1 | 11/2012 | Nair et al. |
| 2012/0311176 A1 | 12/2012 | Dellinger et al. |
| 2012/0315872 A1 | 12/2012 | Amato et al. |
| 2013/0023230 A9 | 1/2013 | Momtahan et al. |
| 2013/0028143 A1 | 1/2013 | Vasseur et al. |
| 2013/0035059 A1 | 2/2013 | Liu et al. |
| 2013/0054378 A1 | 2/2013 | Hao et al. |
| 2013/0060653 A1* | 3/2013 | Sharkey ................. H04L 69/321 705/26.3 |
| 2013/0064106 A1 | 3/2013 | Sylvain |
| 2013/0080522 A1 | 3/2013 | Ren |
| 2013/0115940 A1 | 5/2013 | Zhou et al. |
| 2013/0117846 A1 | 5/2013 | Mahaffey et al. |
| 2013/0122882 A1 | 5/2013 | Patel et al. |
| 2013/0136067 A1 | 5/2013 | Praveenkumar et al. |
| 2013/0149994 A1 | 6/2013 | Gaddam et al. |
| 2013/0185292 A1 | 7/2013 | Li et al. |
| 2013/0196615 A1 | 8/2013 | Zalmanovitch et al. |
| 2013/0196616 A1 | 8/2013 | Zalmanovitch et al. |
| 2013/0196617 A1 | 8/2013 | Zalmanovitch et al. |
| 2013/0196618 A1 | 8/2013 | Zalmanovitch et al. |
| 2013/0196621 A1 | 8/2013 | Guday et al. |
| 2013/0196626 A1 | 8/2013 | Zalmanovitch et al. |
| 2013/0198373 A1 | 8/2013 | Zalmanovitch et al. |
| 2013/0198374 A1 | 8/2013 | Zalmanovitch et al. |
| 2013/0297965 A1* | 11/2013 | Mensah ............... H04L 41/0681 714/4.1 |
| 2014/0044099 A1 | 2/2014 | Star |
| 2014/0301218 A1 | 10/2014 | Luo et al. |
| 2015/0181047 A1 | 6/2015 | Zalmanovitch et al. |
| 2016/0112577 A1 | 4/2016 | Guday et al. |
| 2016/0226738 A1 | 8/2016 | Zalmanovitch et al. |
| 2017/0086053 A1 | 3/2017 | Zalmanovitch et al. |
| 2017/0187596 A1 | 6/2017 | Zalmanovitch et al. |
| 2017/0279699 A1 | 9/2017 | Zalmanovitch et al. |
| 2017/0373959 A1 | 12/2017 | Zalmanovitch et al. |
| 2018/0097643 A1 | 4/2018 | Raleigh et al. |
| 2019/0230016 A1 | 7/2019 | Zalmanovitch et al. |

FOREIGN PATENT DOCUMENTS

| | | | |
|---|---|---|---|
| CN | 101401391 A | 4/2009 | |
| CN | 101553797 A | 10/2009 | |
| CN | 101895967 A | 11/2010 | |
| JP | 1011344 A | 1/1998 | |
| JP | 2003102066 A | 4/2003 | |
| JP | 2003299150 A | 10/2003 | |
| JP | 2003338856 A | 11/2003 | |
| JP | 2004072590 A | 3/2004 | |
| JP | 2004140684 A | 5/2004 | |
| JP | 2005168041 A | 6/2005 | |
| JP | 2005198021 A | 7/2005 | |
| JP | 2009230575 A | 10/2009 | |
| JP | 2010103892 A | 5/2010 | |
| JP | 2010531565 A | 9/2010 | |
| JP | 2011124617 A | 6/2011 | |
| JP | 2012138709 A | 7/2012 | |
| JP | 2013534081 A | 8/2013 | |
| JP | 2014502066 A | 1/2014 | |
| JP | 2015519781 A | 7/2015 | |
| KR | 20100037297 A | 4/2010 | |
| KR | 20110023009 A | 3/2011 | |
| WO | 2006004784 A1 | 1/2006 | |
| WO | WO-2006004784 A1 * | 1/2006 | ............ G06F 21/316 |
| WO | 2006113765 A3 | 12/2007 | |
| WO | 2008097105 A1 | 8/2008 | |
| WO | 2008155444 A1 | 12/2008 | |
| WO | 2011139923 A2 | 11/2011 | |
| WO | 2012083285 A2 | 6/2012 | |
| WO | 2012162419 A2 | 11/2012 | |
| WO | 2013033702 A1 | 3/2013 | |

OTHER PUBLICATIONS

"International Preliminary Report on Patentability Issued in PCT Application No. PCT/US2013/22353", dated Aug. 7, 2014, 7 Pages.

"International Search Report & Written Opinion Issued in PCT Application No. PCT/US2013/022353", dated May 15, 2013, 10 Pages.

"International Search Report & Written Opinion Issued in PCT Application No. PCT/US2013/022822", dated Apr. 25, 2013, 9 Pages.

"International Preliminary Report on Patentability Issued in PCT Application No. PCT/US2013/056923", dated Mar. 19, 2015, 8 Pages.

"International Search Report & Written Opinion Issued in PCT Application No. PCT/US2013/056923", dated Jan. 7, 2014, 11 Pages.

Peddemors, Arjan, "Network Resource Awareness and Prediction on Mobile Devices", In Novay PhD Research Series, No. 026 (Novay/PRS/026), Oct. 20, 2009, 236 Pages.

Pluta, et al., "Who Moved My Data? A Backup Tracking System for Dynamic Workstation Environments", In Proceedings of LISA '04: Eighteenth Systems Administration Conference, Nov. 14, 2004, 10 Pages.

"Non-Final Office Action Issued in U.S. Appl. No. 13/721,083", dated Jun. 5, 2015, 10 Pages.

"Notice of Allowance Issued in U.S. Appl. No. 13/721,083", dated Oct. 5, 2015, 8 Pages.

Sinofsky, Steven, "Engineering Windows 8 for Mobile Networks", Retrieved from <<https://blogs.msdn.microsoft.com/b8/2012/01/20/engineering-windows-8-for-mobile-networks/>>, Jan. 20, 2012, 28 Pages.

"Office Action Issued in European Patent Application No. 13741434.8", dated Oct. 26, 2015, 13 Pages.

"Office Action Issued In European Patent Application No. 13741434.8", dated Jul. 19, 2016, 15 Pages.

"Office Action Issued in European Patent Application No. 13741434.8", dated Nov. 27, 2014, 6 Pages.

(56) References Cited

OTHER PUBLICATIONS

"Supplementary Search Report Issued in European Patent Application No. 13741434.8", dated Sep. 30, 2014, 3 Pages.
"Notice of Allowance Issued in European Patent Application No. 13741633.5", dated Aug. 6, 2015, 5 Pages.
"Office Action Issued in European Patent Application No. 13741633.5", dated Nov. 27, 2014, 7 Pages.
"Supplementary Search Report Issued in European Patent Application No. 13741633.5", dated Sep. 18, 2014, 3 Pages.
"Final Office Action Issued in U.S. Appl. No. 14/642,378", dated Oct. 19, 2015, 13 Pages.
"Non-Final Office Action Issued in U.S. Appl. No. 14/642,378", dated Jun. 12, 2015, 12 Pages.
"Non-Final Office Action Issued in U.S. Appl. No. 14/642,378", dated Mar. 2, 2016, 10 Pages.
"Notice of Allowance Issued in U.S. Appl. No. 14/642,378", dated Aug. 4, 2016, 7 Pages.
"Notice of Allowance Issued in U.S. Appl. No. 14/642,378", dated Sep. 26, 2016, 7 Pages.
"Notice of Allowance Issued in U.S. Appl. No. 14/642,378", dated Jan. 17, 2017, 7 Pages.
"Final Office Action Issued in U.S. Appl. No. 14/835,693", dated May 6, 2016, 16 Pages.
"Non-Final Office Action Issued in U.S. Appl. No. 14/835,693", dated Feb. 3, 2016, 14 Pages.
"Non-Final Office Action Issued in U.S. Appl. No. 14/835,693", dated Aug. 26, 2016, 15 Pages.
"Non-Final Office Action Issued in U.S. Appl. No. 14/839,243", dated Jun. 16, 2016, 16 Pages.
"Final Office Action Issued in U.S. Appl. No. 14/988,462", dated Jun. 23, 2017, 11 Pages.
"Non-Final Office Action Issued in U.S. Appl. No. 14/988,462", dated Dec. 16, 2016, 10 Pages.
"Notice of Allowance Issued in U.S. Appl. No. 14/988,462", dated Sep. 20, 2017, 7 Pages.
"Final Office Action Issued in U.S. Appl. No. 15/350,001", dated Dec. 7, 2017, 9 Pages.
"Non Final Office Action Issued in U.S. Appl. No. 15/350,001", dated Jun. 14, 2017, 8 Pages.
"Non-Final Office Action Issued in U.S. Appl. No. 15/589,994", dated Oct. 24, 2017, 15 Pages.
"Non Final Office Action Issued in U.S. Appl. No. 15/620,791", dated Jul. 28, 2017, 12 Pages.
Rhee, Ed, "How to Track Data Usage on your Android Phone", Retrieved from <<http://www.cnet.com/how-to/how-to-track-data-usage-on-your-android-phone/>>, Jul. 8, 2011, 4 Pages.
"Notice of Allowance Issued in Australian Patent Application No. 2013212632", dated Jul. 20, 2017, 3 Pages.
"Office Action Issued in Australian Patent Application No. 2013212632", dated Jun. 12, 2017, 3 Pages.
"First Office Action and Search Report Issued in Chinese Patent Application No. 201380006806.5", dated Dec. 1, 2015, 15 Pages.
"Notice of Allowance Issued in Chinese Patent Application No. 201380006806.5", dated Mar. 1, 2017, 4 Pages.
"Second Office Action Issued in Chinese Patent Application No. 201380006806.5", dated Aug. 12, 2016, 7 Pages.
"First Office Action and Search Report Issued in Chinese Patent Application No. 201380006974.4", dated Nov. 30, 2016, 16 Pages.
"Office Action Issued in Chinese Application No. 201380006974.4", dated Apr. 14, 2017, 18 Pages.
"Office Action Issued in Chinese Patent Application No. 201380006974.4", dated Sep. 18, 2017, 13 Pages.
"Office Action Issued in China Patent Application No. 201380057427.9", dated Aug. 2, 2017, 15 Pages.
"Office Action Issued in Chinese Patent Application No. 201380057427.9", dated Jan. 3, 2016, 15 Pages.
"Notice of Allowance Issued in Russian Patent Application No. 2014131055", dated Nov. 24, 2016, 16 Pages.
"Office Action Issued in Russian Patent Application No. 2014131055", dated Aug. 18, 2016, 5 Pages.
"Notice of Allowance Issued in Japanese Patent Application No. 2014-554756", dated Jul. 11, 2017, 3 Pages.
"Office Action Issued in Japanese Patent Application No. 2014-554756", dated Nov. 22, 2016, 5 Pages.
"Office Action Issued in Japanese Patent Application No. 2014-554805", dated Feb. 14, 2017, 9 Pages.
"Office Action Issued in Japanese Patent Application No. 2014-554805", dated Jul. 19, 2016, 12 Pages.
"Notice of Allowance Issued in Japan Patent Application No. 2015-529965", dated Jul. 25, 2017, 3 Pages. (W/o English Translation).
Balasubramanian, Aruna, "Architecting Protocols to Enable Mobile Applications in Diverse Wireless Networks", A Dissertation Submitted to the Graduate School of the University of Massachusetts Amherst in Partial Fulfillment of the Requirements for the Degree of Doctor of Philosophy, Feb. 2011, 198 Pages.
Blass, Evan, "Exclusive: Windows Phone 8 Detailed", Retrieved from <<http://pocketnow.com/windows-phone/exclusive-windows-phone-8-detailed>>, Feb. 2, 2012, 2 Pages.
Heikkinen, et al., "Measuring Mobile Peer-to-Peer Usage: Case Finland 2007", In Proceedings of the 10th International Conference on Passive and Active Network Measurement, Apr. 28, 2009, pp. 165-174.
Heinz II, Gerard J., "Priorities in Stream Transmission Control Protocol (SCTP) Multistreaming", A Thesis Submitted to the Faculty of the University of Delaware in Partial Fulfillment of the Requirements for the Degree of Master of Degree in Computer and Information Science, 2003, 35 Pages.
"Notice of Allowance Issued in Mexican Patent Application No. MX/a/2014/008566", dated Sep. 23, 2016, 2 Pages.
"Notice of Allowance Issued in Taiwan Patent Application No. 102102234", dated Nov. 30, 2017, 4 Pages.
"Mobile Data Usage Meter—Manage Mobile Data Usage & Wireless Broadband Devices", Retrieved from <<http://web.archive.org/web/20091228092436/http://www.telstrabusiness.com/business/portal/online/site/myaccount/mobiledatausagemeter.94003>>, Jan. 28, 2015, 2 Pages.
"My Data Usage Pro", Retrieved from <<http://download.cnet.com/My-Data-Usage-Pro/3000-2094_4-75402502.html>>. Retrieved Date: Dec. 12, 2014, 3 Pages.
"Rapid Mobile Data Service Creation and Monetization", Retrieved from <<http://qpass.net/Products/network-control/Documents/data-experience-solution-datasheet.pdf>>, Oct. 2, 2012, 7 Pages.
"Notice of Allowance Issued in Taiwan Patent Application No. 102101668", dated Aug. 14, 2017, 4 Pages.
"Office Action and Search Report Issued in Taiwanese Patent Application No. 102101668", dated Dec. 14, 2016, 10 Pages.
"DataMan Pro for iPad—Analyze your 3G Data Usage on Your Computer", Retrieved from <<http://prmac.com/release-id-27794.htm>>, Jul. 9, 2011, 2 Pages.
"Office Action Issued in Taiwan Patent Application No. 102102234", dated Aug. 21, 2017, 10 Pages.
"Final Office Action Issued in U.S. Appl. No. 13/721,023", dated Oct. 27, 2014, 16 Pages.
"Final Office Action Issued in U.S. Appl. No. 13/721,023", dated Oct. 5, 2015, 26 Pages.
"Non-Final Office Action Issued U.S. Appl. No. 13/721,023", dated Mar. 28, 2014, 16 Pages.
"Non-Final Office Action Issued in U.S. Appl. No. 13/721,023", dated Feb. 13, 2015, 19 Pages.
"Non-Final Office Action Issued in U.S. Appl. No. 13/721,023", dated Jun. 16, 2016, 23 Pages.
"Final Office Action Issued in U.S. Appl. No. 13/721,029", dated Oct. 1, 2014, 19 Pages.
"Non-Final Office Action Issued in U.S. Appl. No. 13/721,029", dated Mar. 17, 2015, 25 Pages.
"Non-Final Office Action Issued in U.S. Appl. No. 13/721,029", dated Feb. 18, 2016, 33 Pages.
"Non-Final Office Action Issued in U.S. Appl. No. 13/721,029", dated Mar. 11, 2014, 14 Pages.
Unuth, Nadeem, "Data Usage Monitor Apps for Your iPhone and iPad", Retrieved from <<http://voip.about.com/od/voipbandwidth/

(56) References Cited

OTHER PUBLICATIONS tp/Data-Usage-Monitor-Apps-For-Your-Iphone-And-Ipad.htm>>, Retrieved Date: Oct. 8, 2012, 1 Page.
"Notice of Allowance Issued in U.S. Appl. No. 13/721,029", dated Aug. 30, 2016, 9 Pages.
"Non-Final Office Action Issued in U.S. Appl. No. 13/721,032", dated Aug. 5, 2014, 16 Pages.
"Non-Final Office Action Issued in U.S. Appl. No. 13/721,032", dated Feb. 6, 2014, 11 Pages.
"Notice of Allowance Issued in U.S. Appl. No. 13/721,032", dated Jan. 30, 2015, 13 Pages.
"Final Office Action Issued in U.S. Appl. No. 13/721,041", dated Sep. 14, 2015, 24 Pages.
"Non-Final Office Action Issued in U.S. Appl. No. 13/721,041", dated Mar. 28, 2014, 15 Pages.
"Non-Final Office Action Issued in U.S. Appl. No. 13/721,041", dated Apr. 8, 2016, 24 Pages.
"Non-Final Office Action Issued in U.S. Appl. No. 13/721,041", dated Jan. 7, 2015, 21 Pages.
"Applicant Initialed Interview Summary for U.S. Appl. No. 13/721,053", dated May 30, 2014, 3 Pages.
"Examiner Initiated Interview Summary for U.S. Appl. No. 13/721,053", dated Aug. 19, 2014, 2 Pages.
"Non-Final Office Action Issued in U.S. Appl. No. 13/721,053", dated Mar. 18, 2014, 8 Pages.
"Notice of Allowance Issued in U.S. Appl. No. 13/721,053", dated Oct. 28, 2014, 7 Pages.
"Notice of Allowance Issued in U.S. Appl. No. 13/721,053", dated Aug. 19, 2014, 14 Pages.
"Final Office Action Issued in U.S. Appl. No. 13/721,057", dated Sep. 30, 2015, 36 Pages.
"Final Office Action Issued in U.S. Appl. No. 13/721,057", dated Jul. 15, 2016, 31 Pages.
"Non-Final Office Action Issued in U.S. Appl. No. 13/721,057", dated Feb. 25, 2016, 28 Pages.
"Non-Final Office Action Issued in U.S. Appl. No. 13/721,057", dated Mar. 27, 2015, 30 Pages.
"Final Office Action Issued in U.S. Appl. No. 13/721,058", dated Sep. 22, 2014, 15 Pages.
"Non-Final Office Action Issued in U.S. Appl. No. 13/721,058", dated Apr. 16, 2014, 11 Pages.
"Non-Final Office Action Issued in U.S. Appl. No. 13/721,058", dated Jan. 22, 2015, 13 Pages.
"Notice of Allowance Issued in U.S. Appl. No. 13/721,058", dated May 8, 2015, 7 Pages.
"Notice of Allowance Issued in U.S. Appl. No. 13/721,058", dated Sep. 14, 2015, 3 Pages.
"Final Office Action Issued in U.S. Appl. No. 12/078,132", dated Nov. 14, 2016, 23 Pages.
"Final Office Action Issued in U.S. Appl. No. 13/721,066", dated Oct. 15, 2015, 20 Pages.
"Non-Final Office Action Issued in U.S. Appl. No. 13/721,066", dated Mar. 23, 2016, 27 Pages.
"Non-Final Office Action Issued in U.S. Appl. No. 13/721,066", dated Feb. 13, 2015, 17 Pages.
"Notice of Allowance Issued in U.S. Appl. No. 13/721,066", dated Oct. 6, 2017, 10 Pages.
"Notice of Allowance Issued in U.S. Appl. No. 13/721,066", dated Oct. 30, 2017, 2 Pages.
"Final Office Action Issued in U.S. Appl. No. 13/721,069", dated Nov. 28, 2014, 23 Pages.
"Non-Final Office Action Issued in U.S. Appl. No. 13/721,069", dated Jul. 7, 2015, 27 Pages.
"Non-Final Office Action Issued in U.S. Appl. No. 13/721,069", dated Mar. 14, 2014, 15 Pages.
"Notice of Allowance Issued in U.S. Appl. No. 13/721,069", dated Feb. 17, 2016, 12 Pages.
"Final Office Action Issued in U.S. Appl. No. 13/721,023", dated May 4, 2017, 13 Pages.
"Final Office Action Issued in U.S. Appl. No. 13/721,041", dated Mar. 15, 2017, 22 Pages.
"Final Office Action Issued in U.S. Appl. No. 14/835,693", dated Apr. 5, 2018, 14 Pages.
"Final Office Action Issued in U.S. Appl. No. 14/835,693", dated May 16, 2017, 16 Pages.
"Non-Final Office Action Issued in U.S. Appl. No. 14/835,693", dated Oct. 27, 2017, 14 Pages.
"Non-Final Office Action Issued in U.S. Appl. No. 14/835,693", dated Dec. 12, 2016, 15 Pages.
"Final Office Action Issued in U.S. Appl. No. 14/839,243", dated May 5, 2017, 11 Pages.
"Non-Final Office Action Issued in U.S. Appl. No. 15/350,001", dated Apr. 23, 2018, 8 Pages.
"Non Final Office Action Issued in U.S. Appl. No. 15/365,919", dated Oct. 25, 2017, 26 Pages.
"Final Office Action Issued In U.S. Appl. No. 15/350,001", dated Sep. 13, 2018, 9 Pages.
"Final Office Action issued in U.S. Appl. No. 15/589,994", dated Apr. 5, 2018, 15 Pages.
"Office Action Issued In Mexican Patent Application No. MX/a/2017/001228", dated Jun. 22, 2018, 3 Pages.
"Office Action Issued in Korean Patent Application No. 10-2014-7023636", dated Dec. 12, 2018, 21 Pages.
"Non Final Office Action Issued in U.S. Appl. No. 15/350,001", dated Jan. 14, 2019, 8 Pages.
"Office Action Issued in Canadian Patent Application No. 2,863,455", dated Nov. 8, 2018, 4 Pages.
"Final Office Action Issued in U.S. Appl. No. 15/350,001", dated Apr. 25, 2019, 9 Pages.
"Office Action Issued in Canadian Patent Application No. 2863455", dated Apr. 24, 2019, 4 Pages.
"Office Action Issued in Korean Patent Application No. 10-2014-7023845", dated Jul. 12, 2019, 13 Pages
"Non Final Office Action Issued in U.S. Appl. No. 16/221,444", dated Jul. 26, 2019, 11 Pages.
"Office Action Issued in Indian Patent Application No. 5420/CHENP/2014", dated Feb. 11, 2020, 6 Pages.
"Office Action Issued In Brazilian Patent Application No. BR112014018380-5", dated Dec. 26, 2019, 5 Pages.
"Final Office Action Issued in U.S. Appl. No. 16/221,444", dated Jan. 8, 2020, 13 Pages.
"Non-Final Office Action Issued in U.S. Appl. No. 15/589,994", dated Jun. 30, 2020, 14 Pages.
"Final Office Action Issued in U.S. Appl. No. 15/589,994", dated Dec. 14, 2020, 15 Pages.

* cited by examiner

MANAGING DATA TRANSFERS OVER NETWORK CONNECTIONS BASED ON PRIORITY AND A DATA USAGE PLAN

CROSS-REFERENCE TO RELATED APPLICATIONS

This application is a continuation of U.S. Non-Provisional application Ser. No. 13/721,066, filed Dec. 20, 2012, which claims the benefit of U.S. Provisional Application No. 61/696,472, filed Sep. 4, 2012, U.S. Provisional Application No. 61/591,503, filed Jan. 27, 2012, and U.S. Provisional Application No. 61/591,509, filed Jan. 27, 2012. The entireties of these applications are hereby incorporated by reference herein.

This application is related to the following applications: U.S. patent application entitled "Tracking Data Usage Under a Schematized Data Usage Plan," U.S. patent application entitled "On-Device Attribution of Network Data Usage," U.S. patent application entitled "Predicting Network Data Consumption Relative to Data Usage Patterns," U.S. patent application entitled "Updating Dynamic Data Usage Plans and Statistics," U.S. patent application entitled "Data Usage Profiles for Users and Applications," U.S. patent application entitled "Recommendations for Reducing Data Consumption Based on Data Usage Profiles," U.S. patent application entitled "Dynamically Adjusting a Data Usage Plan Based on Data Usage Statistics," and U.S. patent application entitled "Managing Network Data Transfers in View of Multiple Data Usage Plans." All of these applications are incorporated by reference herein in their entirety.

BACKGROUND

With the increased popularity of smart telephones, tablets, and other mobile devices, there has been a similar increase in the amount of data handled by the networks of mobile operators. To reduce the strain on network infrastructure and to reduce network transfer costs, mobile operators are shifting from offering unlimited mobile data plans to offering capped and metered plans. With some of the capped and metered plans, the fees for exceeding the allotted data caps may be significant. While some existing web browsers attempt to optimize data traffic, the existing systems generally lack mechanisms for balancing specific needs of each user with data transfer costs. As a result, with the existing systems, users can unknowingly exceed the allotted data caps and experience bandwidth throttling (e.g., a reduction or limit placed upon the rate of consumption) and/or be presented with a much larger than normal monthly bill, resulting in "bill shock." Throttling and bill shock can impact the user experience, leading to dissatisfied customers, increased customer service calls, and negative impressions of the mobile operators.

SUMMARY

Embodiments of the disclosure manage use of network connections for data transfer. A first computing device receives a plurality of data transfer requests from one or more applications executing on the first computing device. Each of the plurality of data transfer requests has priority information associated therewith. The priority information is compared with one or more network connections between the first computing device and a second computing device. One or more of the received plurality of data transfer requests are selected for initiation based at least on the comparison and based on a data usage plan associated with a user of the first computing device. In other embodiments, the data transfer requests are selected for initiation based on other factors or considerations in addition to the priority information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable prioritizing of data transfer requests 112 to manage data consumption. In some embodiments, a service executing on a computing device 102 allows applications 110 to define priority information 114 for each of the data transfer requests 112. The service matches available network connections 132 to the data transfer requests 112 based on the priority information 114 and, in some embodiments, on data usage statistics 120 in view of a data usage plan 116. The data usage statistics 120 are used to determine whether a user and/or computing device 102 is under track, on track, or off track for usage compared to allotted usage under the data usage plan 116. For example, the data usage plan 116 may be associated with the user 104, computing device 102, a group of users 104, a group of computing devices 102, or any combination thereof. In some embodiments, the service notifies the selected applications 110 when the network connection 132 matching the requested priority information 114 is no longer available and/or when the data usage is predicted to exceed a billing period allotment. In response, the application 110 is able to halt data transfers to preserve data consumption for tasks with higher priority.

Aspects of the disclosure further enable applications 110 to prioritize and balance data transfers based on user experience immediacy requirements. For example, the applications 110 may defer lower-priority operations to non-costed network connections 132. This enables the computing device 102 to differentiate urgency of traffic to minimize the amount of data transferred over any particular network type when the device is on a free Wi-Fi connection, pay-based Wi-Fi connection, tethered connection, cellular connection, multi-SIM devices, etc.

Figure 1:
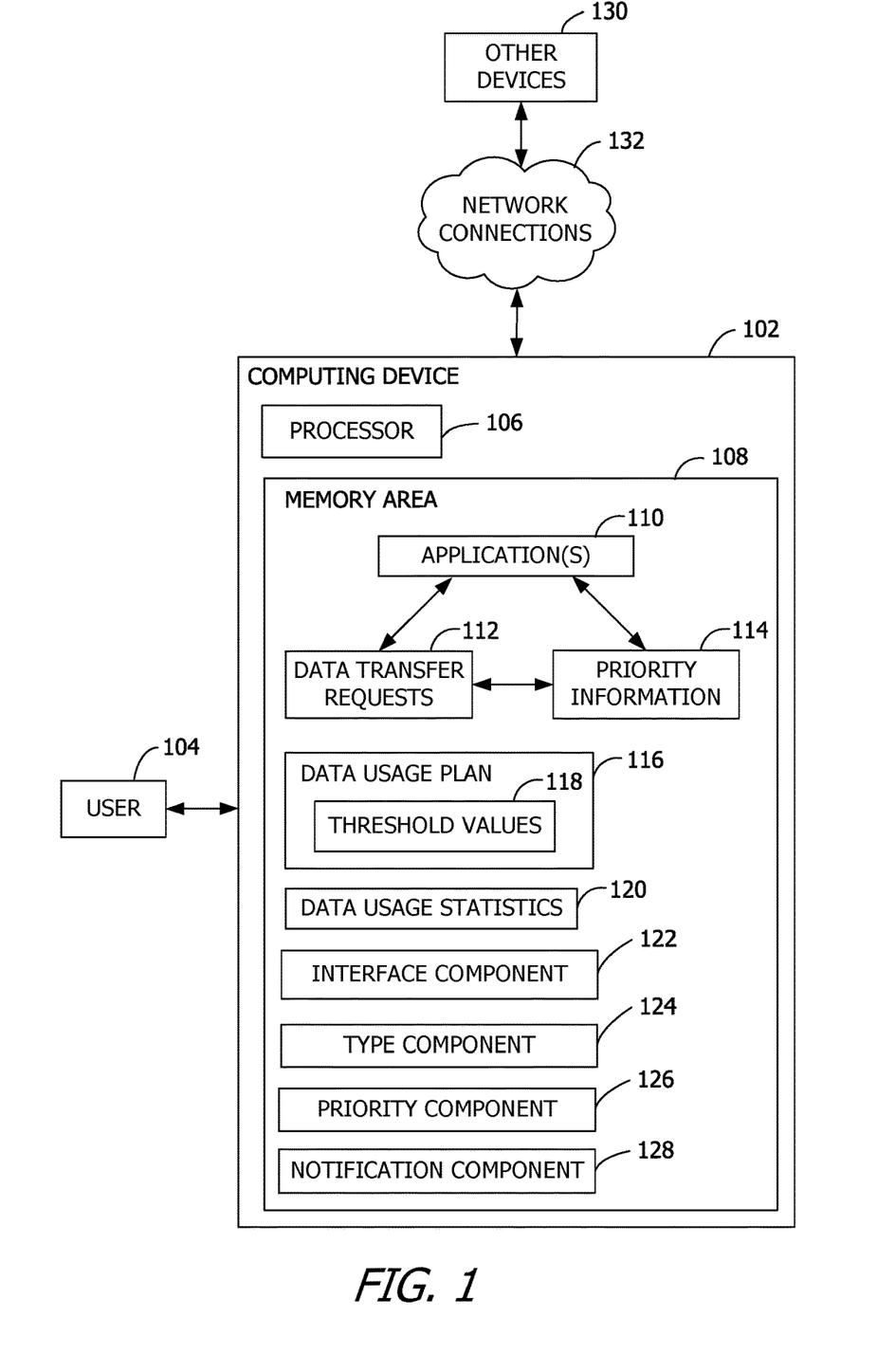
FIG. 1 is an exemplary block diagram illustrating a computing device communicating with a plurality of other devices via one or more network connections.

Referring next to FIG. 1, an exemplary block diagram illustrates the computing device 102 (e.g., a first computing device) communicating with one or more other devices 130 (e.g., second computing devices) via one or more network connections 132. In the example of FIG. 1, the computing device 102 associated with the user 104 represents a system for managing use of network connections 132 for data transfer. The computing device 102 represents any device executing instructions (e.g., as application programs, operating system functionality, or both) to implement the operations and functionality associated with the computing device 102. The computing device 102 may include a mobile computing device or any other portable device. In some embodiments, the mobile computing device includes a mobile telephone, laptop, tablet, computing pad, netbook, gaming device, and/or portable media player. The computing device 102 may also include less portable devices such as desktop personal computers, kiosks, and tabletop devices. Additionally, the computing device 102 may represent a group of processing units or other computing devices.

In some embodiments, the computing device 102 has at least one processor 106, a memory area 108, and at least one user interface (e.g., a touch screen or natural user interface). The processor 106 includes any quantity of processing units, and is programmed to execute computer-executable instructions for implementing aspects of the disclosure. The instructions may be performed by the processor 106 or by multiple processors executing within the computing device 102, or performed by a processor external to the computing device 102. In some embodiments, the processor 106 is programmed to execute instructions such as those illustrated in the figures (e.g., FIG. 2).

In some embodiments, the processor 106 represents an implementation of analog techniques to perform the operations described herein. For example, the operations may be performed by an analog computing device and/or a digital computing device.

The computing device 102 further has one or more computer readable media such as the memory area 108. The memory area 108 includes any quantity of media associated with or accessible by the computing device 102. The memory area 108 may be internal to the computing device 102 (as shown in FIG. 1), external to the computing device 102 (not shown), or both (not shown). In some embodiments, the memory area 108 includes read-only memory and/or memory wired into an analog computing device.

The memory area 108 stores, among other data, one or more of the applications 110. The applications 110, when executed by the processor 106, operate to perform functionality on the computing device 102. Exemplary applications 110 include mail application programs, web browsers, calendar application programs, address book application programs, messaging programs, media applications, location-based services, search programs, and the like. The applications 110 may communicate with counterpart applications or services such as web services accessible via one or more networks. For example, the applications 110 may represent downloaded client-side applications that correspond to server-side services executing in a cloud.

As another example, the applications 110 may send and receive data over one or more network connections 132 to other devices 130 or services. For example, the network connections 132 may include Wi-Fi, cellular, BLUETOOTH brand communication, near-field communication (NFC), and other types or configurations of one or more of the networks.

The memory area 108 further stores a plurality of data transfer requests 112 received from one or more of the applications 110. The data transfer requests 112 represent requests by the applications 110 for use of at least one of the network connections 132. In some embodiments, each data transfer request 112 has priority information 114 associated therewith. The priority information 114 indicates a priority for association with the data transfer request 112, such as a level, degree, type, or other relative or absolute ordering information in a hierarchy of priorities.

The priority information 114 for a particular data transfer request 112 may be provided by the application 110 providing the particular data transfer request 112. In other embodiments, the priority information 114 may be linked to characteristics or type of data transfer requests 112 or applications 110 providing the data transfer requests 112. For example, the priority information 114 associated with data transfer requests 112 from a mail application program may indicate a higher priority than priority information 114 associated with data transfer requests 112 from a social networking application program.

Exemplary priority information 114 includes priorities such as Explicit, Background, Opportunistic, and Predictive, as described in Table 1 below. Aspects of the disclosure, however, are not limited to the following exemplary priorities or descriptions.

TABLE 1

Exemplary Priority Information.

| Priority | | Description |
|---|---|---|
| Priority 1 (P1) | Explicit user operation | This priority is associated with a data transfer request resulting from an action the user has taken, either directly through the user interface or via a settings page. The action may be a single or recurring operation that the user expects to be initiated, invoked, and/or completed based on time or event. The data transfer request is known or expected to consume data, and the data transfer request should not be deferred. |
| Priority 2 (P2) | Background (e.g., explicit intent/ implicit core experience) | This priority is associated with a data transfer request resulting from a user action that does not directly request to consume data. If the data transfer request is not completed immediately, or at a specified time, the user experience will not be impacted negatively, but may lead to visible, noticeable, and/or perceptible differences in the user experience. |
| Priority 3 (P3) | Opportunistic operation (e.g., deferred operation) | This priority is associated with a data transfer request that, if not completed at a specified time, will not impact the user experience negatively. The data transfer request may be scheduled when there is a low or very low risk of exceeding the threshold values under the data usage plan. |
| Priority 4 (P4) | Predictive operation | This priority is associated with a data transfer request that does not have a specific target completion time, but should rather be performed upon detecting appropriate opportunities based on heuristics. |

An example of a P4 data transfer request may be sent by one of the applications 110 that determines that the user 104 is leaving for Vancouver soon (e.g., based on an analysis of an electronic calendar of the user 104). The application 110 generates the data transfer request with priority P4 to download relevant navigation map tiles opportunistically before the trip, such as while on a free or reduced cost connection (e.g., Wi-Fi rather than cellular). When the trip begins, the computing device 102 may then already have the navigation map tiles thereby reducing data usage on a cellular or roaming network connection 132.

The memory area 108 further stores the data usage plan 116. The data usage plan 116 represents, for example, the mobile data plan agreement between the user and the mobile operator. The data usage plan 116 defines the usage limits associated with data transfer to/from the computing device 102, and/or usage limits associated with other devices of the user (e.g., mobile device, tablet, and laptop). The usage limits may also be associated with a group of users 104 or group of devices 102 (such as in a shared plan embodiment). In some embodiments, the data usage plan 116 describes threshold values 118 associated with at least one of the network connections 132. For example, the data usage plan 116 may indicate that two megabytes per month of data transfer over a digital cellular network connection 132 is available, while there is unlimited data transfer available over a Wi-Fi network connection 132.

The computing device 102 monitors data transfer usage by the applications 110, and generates data usage statistics 120. The data usage statistics 120 represent an amount of network data consumed by the computing device 102 under the data usage plan. The data usage statistics 120 identify, to a granularity of time (e.g., per minute) or data (e.g., per kilobyte), how much data has been sent and/or received by the computing device 102, the time and date of usage (e.g., start and end times), the location of usage, network interface used (e.g., over which network connections), roaming state, data usage plan information, the subscriber identity module (SIM) or other user identity module used for dual SIM scenarios, the international mobile station equipment identity (IMEI) or other device identifier for multi-device scenarios, the Internet protocol (IP) address or other address of the access point used for Wi-Fi scenarios, the IP address or other address of a target computer (e.g., for whitelist/blacklists in data usage), the application responsible for the data transfer, and the like. In a further example, information relating to text messages, data, voice calls, minutes used, voice over Internet Protocol (VoIP) usage, and any other element of usage consumed by, or that impacts, the computing device 102 is collected to produce the data usage statistics 120. Other data usage statistics 120 are also contemplated.

The memory area 108 further stores one or more computer-executable components. Exemplary components include an interface component 122, a type component 124, a priority component 126, and a notification component 128. Operation of these components, when executed, is described below with reference to FIG. 2.

Figure 2:
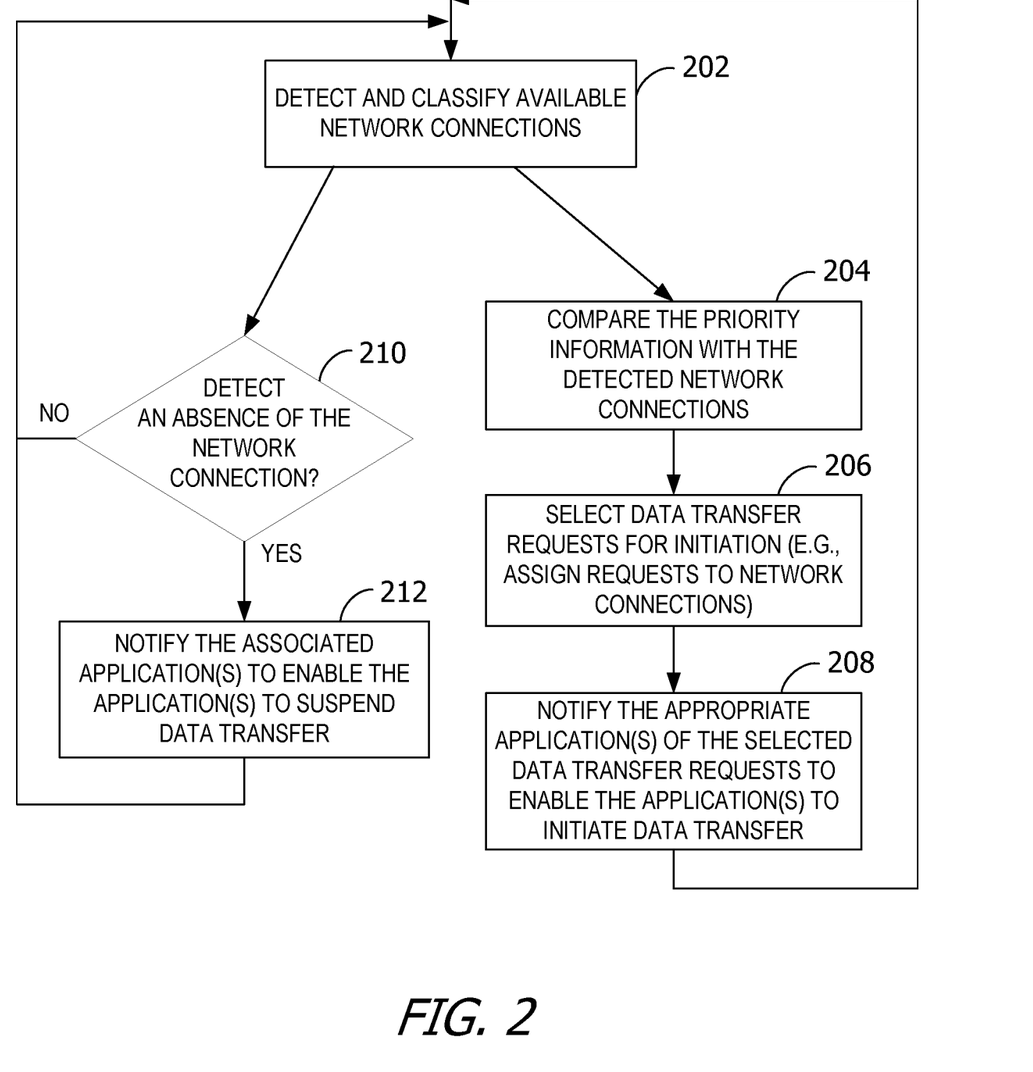
FIG. 2 is an exemplary flow chart illustrating operation of the computing device to map data transfer requests to detected network connections based on priority information.

Referring next to FIG. 2, an exemplary flow chart illustrates operation of the computing device 102 to map data transfer requests 112 to detected network connections 132 based on priority information 114. While the operations illustrated in FIG. 2 are performed by a mobile computing device in some embodiments, one or more of the operations may be performed by other devices, including any computing device local to, or remote from, the user 104. For example, the operations may be performed by a proxy device in communication with the mobile computing device. Further, in some embodiments, the operations illustrated in FIG. 2 are performed by an operating system executing on the mobile computing device.

At 202, the computing device 102 detects, or is informed of, available network connections 132 between the computing device 102 (e.g., a first computing device) and one or more other computing devices (e.g., second computing devices). For example, the computing device 102 may determine whether the network connection 132 has been established and/or has not expired. As another example, the computing device 102 may actually send a test packet (e.g., a ping) over each open network connection 132 to confirm the availability of each network connection 132. In some embodiments, the computing device 102 may further classify each of the detected network connections 132. For example, the network connections 132 may be classified according to type, speed, cost, and/or other factors or criteria.

The computing device 102 accesses at least one of the data transfer requests 112 from the applications 110. For example, the computing device 102 may access the memory area 108 to retrieve or obtain the data transfer requests 112 that have been stored there by the applications 110, or the computing device 102 may receive the data transfer requests 112 from the applications 110 directly. The computing device 102 determines the priority information 114 associated with each of the data transfer requests 112. For example, the priority information 114 for one or more of the data transfer requests 112 may be specified by the requesting applications 110 or by a software vendor associated with the requesting applications 110. For those data transfer requests 112 lacking the priority information 114, the computing device 102 may assign default priority information 114.

At 204, the priority information 114 for each of the accessed data transfer requests 112 is compared with the detected network connections 132 (and possibly the classifications associated therewith). In some embodiments, the priority information for one or more of the data transfer requests 112 includes a quality of service (QoS) requirement or request associated with the data transfer requests 112. The QoS requirements may be expressed by the applications 110. In some embodiments, other factors or considerations are contemplated. The other factors include a battery level (e.g., power remaining) for the computing device 102, which may be compared against the amount of power anticipated to be consumed by initiating the data transfer requests 112 over the network connections 132.

At 206, the computing device 102 selects one or more of the accessed data transfer requests 112 for initiation based on the comparison, resulting in assignments between the one or more accessed data transfer requests 112 and the detected network connections 132. The relationship between the selected data transfer requests 112 and the network connections 132 may be stored, for example, in a file, table, database, or other data structure. In some embodiments, the computing device 102 attempts to match the requested priority information 114 with the available network connections 132.

For example, using the exemplary priority information 114 described above in Table 1, priority P1 data transfer requests may be matched to any cellular or Wi-Fi network connections 132, priority P2 data transfer requests may be matched to any cellular or Wi-Fi network connections 132 when the computing device 102 is not roaming, priority P3 data transfer requests may be matched to any Wi-Fi network connections 132, and priority P4 data transfer requests may be matched only to free or otherwise non-costed Wi-Fi network connections 132.

Selection of the accessed data transfer requests 112 may further include analyzing the data usage plan 116 associated with the user 104 and/or computing device 102. For example, the computing device 102 may track a cumulative amount of data transfers occurring over each of the network connections 132. The computing device 102 compares the tracked, cumulative amounts to the corresponding threshold values 118 associated with each of the network connections 132. Alternatively or in addition, the computing device 102 compares a projection of the tracked, cumulative amounts (e.g. associated with the end of the billing cycle) to the corresponding threshold values 118 associated with each of the network connections 132. The computing device 102 selects one or more of the data transfer requests 112 based on the comparison. For example, the computing device 102 determines whether the tracked, cumulative amounts of the available network connections 132 are less than the corresponding threshold values 118. If the computing device 102 determines that there is remaining data consumption available over particular, available network connections 132 (e.g., the cumulative amounts are less than the threshold values 118), the computing device 102 proceeds to match the data transfer requests 112 to those network connections 132. For the network connections 132 over which no further data consumption is available, the computing device 102 removes those network connections 132 from consideration when assignment data transfer requests 112 to network connections 132. The threshold values 118 may be obtained from the data usage plan 116.

For example, the computing device 102 may correlate the detected network connections 132 with current consumption under the data usage plan 116 to determine which of the network connections 132 are available to the applications 110 as shown in Table 2 below. Table 2 below continues use of the example priorities provided in Table 1 above.

TABLE 2

Exemplary Match Criteria for Relative Consumption Under Data Usage Plan.

| Priority | | Match Criteria |
|---|---|---|
| Priority 1 (P1) | Explicit user operation | For a data transfer request having priority P1, match to any network connection when the user is Off Track, On Track, or Under Track |
| Priority 2 (P2) | Background (e.g., explicit intent/ implicit core experience) | For a data transfer request having priority P2, match to any network connection only when the user is On Track or Under Track, or on an unlimited plan (e.g., no threshold values or limits). |
| Priority 3 (P3) | Opportunistic operation (e.g., deferred operation) | For a data transfer request having priority P3, match to any network connection only when the user is Under Track, or on an unlimited plan (e.g., no threshold values or limits). |
| Priority 4 (P4) | Predictive operation | For a data transfer request having priority P4, match to any network connection only when the user is on an unlimited plan (e.g., no threshold values or limits). |

If multiple network connections 132 are available, the computing device 102 may sort the network connections 132 when notifying the applications 110. For example, the network connections 132 may be sorted from free to expensive, and/or fast to slow.

The computing device 102 initiates the selected data transfer requests 112 or may notify, at 208, the associated applications 110 of the selection to enable those applications 110 to initiate at least one of their corresponding, selected data transfer requests 112.

After analyzing the network connections 132 at 202, the computing device 102 may conclude that one of the network connections 132 previously detected is no longer available, or is about to be no longer available. If the computing device 102 detects such an absence or anticipated absence of one or more of the previously detected network connections 132 at 210, the computing device 102 identifies the application(s) 110 that may be attempting to perform data transfers with the now-absent network connection 132. For example, the computing device 102 may analyze the previous mappings or assignments between data transfer requests 112 and network connections 132. At 212, the computing device 102 notifies those applications 110 of the detected absence of the network connections 132.

In response, the notified applications 110 may suspend or postpone performance of their data transfer requests 112 over the now-absent, or soon-to-be-absent, network connections 132. The notified applications 110 may then initiate one or more of the suspended or postponed data transfers over a different network connection 132 that is available. For example, if the computing device 102 detects that a first network connection 132 is no longer available, the applications 110 may suspend performance over the first network connection 132 and resume or initiate performance over a second network connection 132. In embodiments in which a data transfer cost associated with the second network connection 132 is greater (or more expensive) than a data transfer cost associated with the first network connection 132, or based on the data usage statistics 120, the applications 110 (and/or the priority component 126) may choose to not use the second network connection 132. Instead, the applications 110 may attempt to prevent performance of the data transfer requests 112 over the second network connection 132 to prevent incurring higher network transfer costs for the user 104.

In some embodiments, one or more of the operations illustrated in FIG. 2 are performed by the computer-executable components illustrated in FIG. 1. For example, the interface component 122, when executed by the processor 106 of the computing device 102, causes the processor 106 to receive a plurality of the data transfer requests 112 from one or more of the applications 110 executing on the computing device 102. The type component 124, when executed by the processor 106 of the computing device 102, causes the processor 106 to classify one or more of the network connections 132 detected between the computing device 102 and at least one other computing device. The priority component 126, when executed by the processor 106 of the computing device 102, causes the processor 106 to assign one or more of the data transfer requests 112 to the classified network connections 132 based on the priority information 114 and remaining bandwidth (e.g., remaining data consumption) associated with the classified network connections 132. The data consumption remaining may be determined from the data usage plan 116 and/or the data usage statistics 120. In some embodiments, the priority component 126 sorts the network connections 132 based on the classifications from the type component 124. The notification component 128, when executed by the processor 106 of the computing device 102, causes the processor 106 to notify the applications 110 of the assigned data transfer requests 112.

Figure 3:
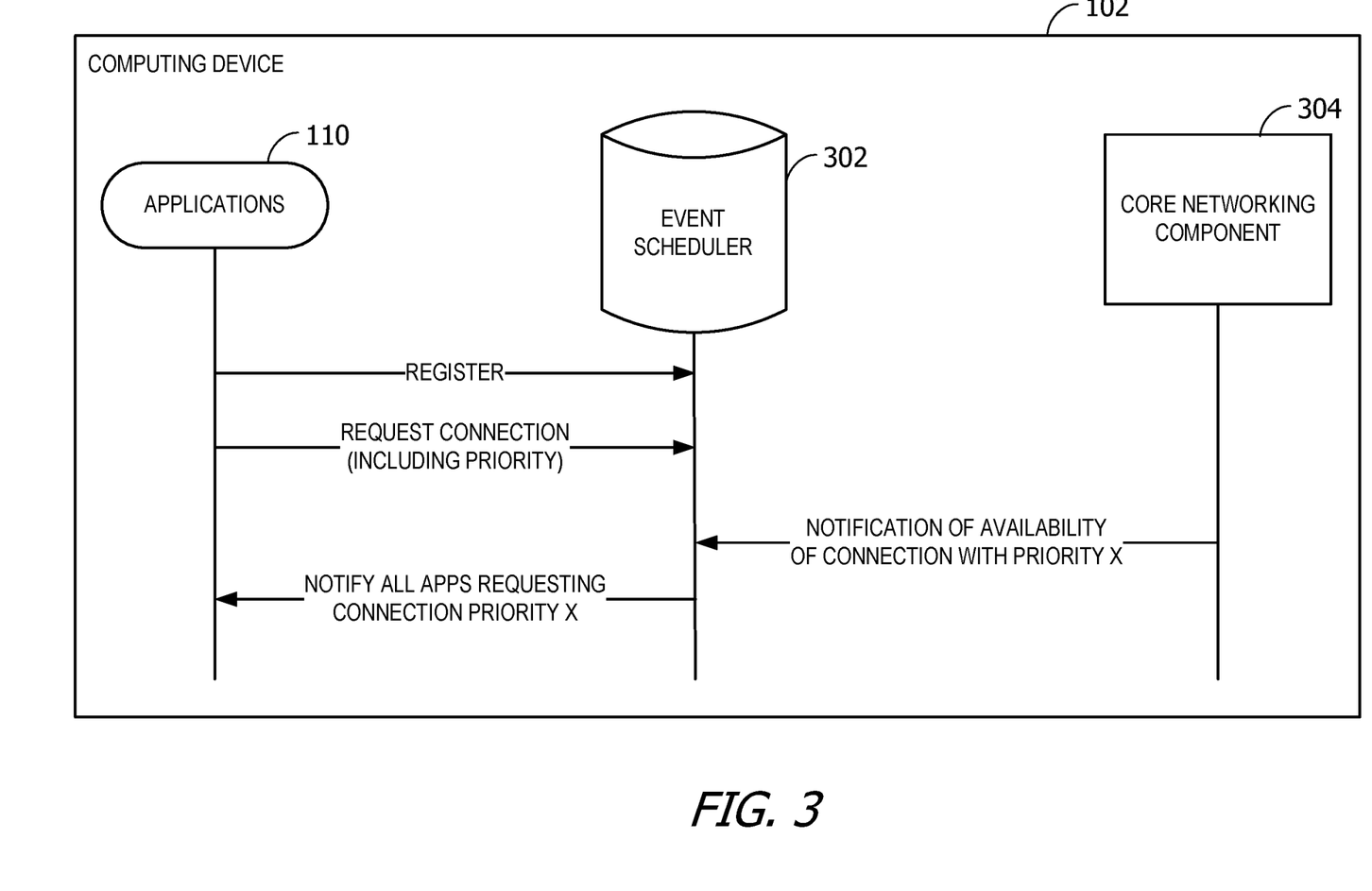
FIG. 3 is an exemplary sequence diagram illustrating notification of network connection availability for initiation of data transfer requests.

Referring next to FIG. 3, an exemplary sequence diagram illustrates notification of network connection 132 availability for initiation of the data transfer requests 112. One or more of the applications 110 register with an event scheduler 302, or other component executing on the computing device 102 for assignments between the data transfer requests 112 and the network connections 132. One or more of the registered applications 110 requests use of at least one of the network connections 132 to initiate a data transfer (e.g., send or receive). Those applications 110 may also provide the priority information 114 associated with the data transfer requests 112.

A core networking component 304 executes on the computing device 102 to detect the network connections 132 available to the computing device 102. The core networking component 304 may analyze each of the network connections 132 continuously (e.g., without interruption) or continually (e.g., periodically), such as every minute. In other embodiments, the core networking component 304 analyzes each of the network connections 132 upon receiving a request for use of at least one of the network connections 132 from at least one of the applications 110. Further, the core networking component 304 may have different schedules for checking different network connections 132. For example, the core networking component 304 may check the availability of a Wi-Fi connection less frequently than the availability of a roaming cellular connection.

In addition to checking the presence or absence of the networking connections, the core networking component 304 (or another component executing on the computing device 102) may check the data usage statistics 120 when determining whether a particular networking connection is available for use by the applications 110. If the user 104 and/or device has exceeded, or is about to exceed, the threshold values 118 for a particular network connection 132, the core networking component 304 may determine that the particular network connection 132 is not "available" to avoid incurring extra charges under the data usage plan 116.

The core networking component 304 notifies the event scheduler 302 of the presence and/or absence of the network connections 132. Upon receipt of this notification, the event scheduler 302 maps or matches the queued data transfer requests 112 to the available network connections 132. For example, if the notification from the core networking component 304 indicates that a network connection 132 with priority X is available, the event scheduler 302 identifies the registered applications 110 that have sent or queued data transfer requests 112 having priority information 114 specifying priority X.

Figure 4:
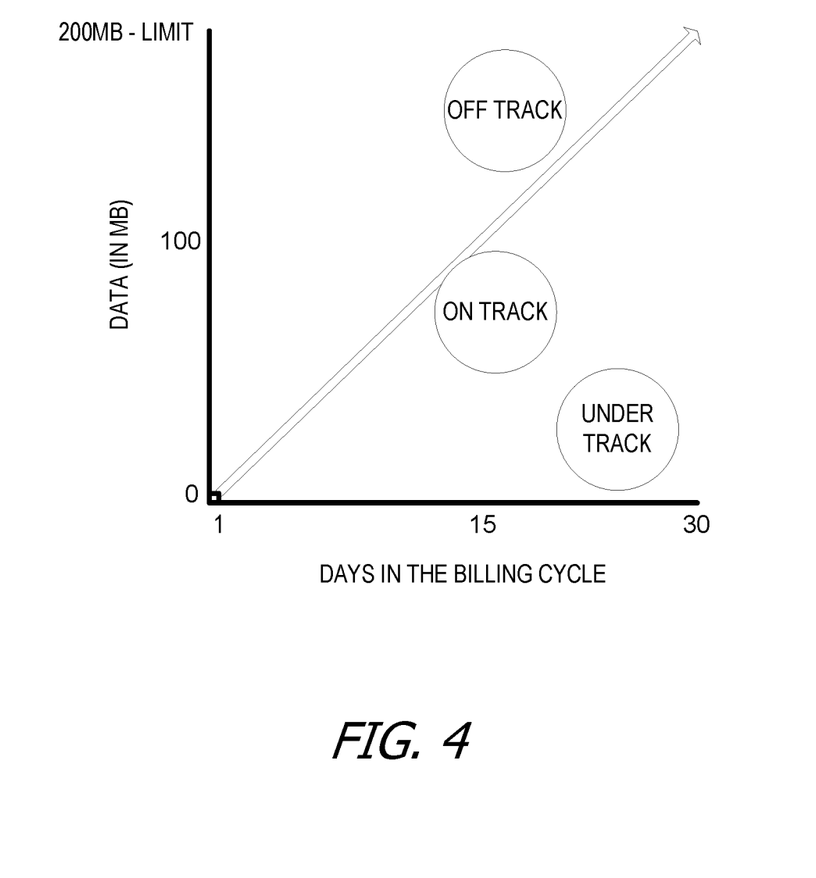
FIG. 4 is an exemplary graph illustrating data consumption compared to a data usage plan.

Referring next to FIG. 4, an exemplary graph illustrates data consumption compared to an exemplary data usage plan 116. In the example of FIG. 4, the exemplary data usage plan 116 indicates that 200 megabytes (MB) is the threshold values 118 for a particular network connection 132 type (e.g., cellular) each month. Other threshold values 118 (e.g., other than 200 MB) and other billing periods (e.g., other than one month) are contemplated. The line in the graph in FIG. 4 reflects the linear usage of the 200 MB over the course of the month. However, other data usage patterns such as non-linear patterns are also contemplated. In general, the shape of the usage curve is fit to, or otherwise dependent on, the pattern of the usage (e.g., the data usage pattern). For example, the data usage patterns may be based on the historical network data consumption of the user 104 and/or other users 104.

The computing device 102 and/or the mobile operator track the data consumption by the user 104 and/or computing device 102 to generate the data usage statistics 120. The circles in the graph indicate the approximate areas where the user 104 and/or computing device 102 is Off Track (e.g., usage greater than the data usage pattern, the user 104 is on track to exceed 200 MB of data consumption before the end of the month), On Track (e.g., usage approximately equal to the data usage pattern, the user 104 is on track to consume 200 MB around the end of the month), and Under Track (e.g., usage less than the data usage pattern, the user 104 is not on track to consume the full 200 MB before the end of the month).

In some embodiments, Off Track may be defined as the user 104 being on or above the projected limit (e.g., the value of the curve) given the day of the billing cycle and the current or up-to-date data consumption for the billing period. For example, given the day of the billing cycle and the current or up-to-date data consumption for the billing period, an extrapolation or projection is performed to predict the consumption associated with the end of the billing cycle. Similarly, On Track may be defined as the user 104 being at least 5% below the projected limit given the day of the billing cycle and the current or up-to-date data consumption for the billing period. Under Track may be defined as the user 104 being at least 20% below the projected limit given the day of the billing cycle and the current or up-to-date data consumption for the billing period. In some further embodiments, a notification is sent to the user 104 and/or applications 110 if the data usage is within 10% of the limit for a particular network connection 132 at any point during the billing period. The computing device 102 may then halt priority P3 data transfer requests using that network connection 132.

Some embodiments contemplate an "Over Limit" category that allows users to opt out of data consumption by background transfers unless the background transfer are user-initiated or deemed critical.

ADDITIONAL EXAMPLES

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 and FIG. 3 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "roaming" as used herein refers, in some embodiments, to connectivity provided outside a subscriber's home zone that may be subject to additional tariffs, fees, or constraints. Roaming service may or may not be provided by the same mobile operator 111. The term "tethered" as used herein refers, in some embodiments, to situations where one device acts as an access point for another device for network access. A tethered connection may occur over a wired connection or a wireless connection. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Aspects of the disclosure are capable of operation and/or display on any computing device or screen. For example, the user 104 may move between a mobile device, a gaming console, an in-vehicle computing system (e.g., entertainment and/or navigation), a portable media player, and a laptop.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for reducing data transfer costs by opportunistic use of the network connections 132 based on the priority information 114.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for managing use of network connections for data transfer, said system comprising:
    a memory area associated with a computing device, said memory area storing a plurality of data transfer requests received from at least one application of a plurality of applications executing on the computing device, the memory area further storing priority information associated with the plurality of data transfer requests; and
    a processor programmed to:
        compare the priority information stored in the memory area with a plurality of available network connections between the computing device and one or more other computing devices;
        select, from the received plurality of data transfer requests, a data transfer request identified as a high priority data transfer request;
        based on the comparing, assigning the data transfer request to a first network connection of the plurality of available network connections to initiate the data transfer request;
        prior to initiating the data transfer request, detect an absence of the first network connection;
        determine that all other available network connections have data transfer costs that are greater than a data transfer cost associated with the first network connection;

based on the detected absence of the first network connection and the determination that all other available network connections have data transfer costs that are greater than a data transfer cost associated with the first network connection, determine that none of the other available network connections should be used to initiate data transfer requests unless the data transfer requests are high priority;

notify the application associated with the selected data transfer request of the detected absence of the first network connection; and based on notifying the application associated with the selected data transfer request of the detected absence of the first network connection and that the selected data transfer request is high priority, re-assigning the selected data transfer request to one or more other network connections of the plurality of available network connections while the first network connection is absent.

2. The system of claim 1, wherein the selected data transfer request is operable with the first network connection and a second network connection, and wherein the application suspends performance of non-high priority data transfer requests in response to the notification to prevent performance of the non-high priority data transfer requests over the second network connection.

3. The system of claim 2, wherein a data transfer cost associated with the second network connection is greater than the data transfer cost associated with the first network connection.

4. The system of claim 1, wherein the memory area further stores a data usage plan describing threshold values associated with the first network connection.

5. The system of claim 4, wherein the processor is programmed to select one or more of the received plurality of data transfer requests by selecting the one or more of the received plurality of data transfer requests by analyzing remaining data consumption based on the threshold values.

6. The system of claim 1, wherein the processor is programmed to notify the application to reduce data transfer costs.

7. The system of claim 1, wherein the computing device and the one or more other computing devices share a data plan.

8. The system of claim 7, wherein determining that no other available network connection should be used to initiate the data transfer requests unless the data transfer requests are high priority is further based on the data usage plan.

9. A method comprising:

receiving a plurality of data transfer requests from one or more applications executing on a first computing device, the plurality of data transfer requests having priority information associated therewith;

assigning one or more of the received plurality of data transfer requests that are identified as high priority data transfer requests for initiation over the first network connection;

prior to initiating the selected one or more of the received plurality of data transfer request, detecting an absence of the first network connection;

determining that all other available network connections have data transfer costs that are greater than a data transfer cost associated with the first network connection;

based on the detected absence of the first network connection and the determining that all the other available network connections have data transfer costs that are greater than the data transfer cost associated with the first network connection, determining that none of the other available network connections should be used to initiate data transfer requests unless the data transfer requests are high priority;

notifying the application associated with the selected one or more of the received plurality of data transfer requests of the detected absence of the first network connection; and based on the absence of the first network connection and notifying the application associated with the selected one or more of the received plurality of data transfer requests of the detected absence of the first network connection and that the selected one or more of the received plurality of data transfer requests is high priority, re-assigning the selected one or more of the received plurality of data transfer requests to one or more of the other available network connections while the first network connection is absent.

10. The method of claim 9, further comprising, for each of the received plurality of data transfer requests, determining the priority information to be one or more of the following: explicit, background, opportunistic, and predictive.

11. The method of claim 9, further comprising receiving the priority information from the one or more applications for the plurality of data transfer requests.

12. The method of claim 9, further comprising suspending all non-high priority data transfer requests of the received plurality of data transfer requests based on an amount of data transferred from the first computing device defined by a data usage plan.

13. The method of claim 9, further comprising notifying the applications associated with the selected one or more of the received plurality of data transfer requests of the selecting, wherein the notified applications initiate the data transfer requests.

14. The method of claim 9, further comprising comparing the priority information with the first network connection, wherein comparing further comprises comparing tracked, cumulative amount of data to corresponding threshold values associated with the first network connection.

15. The method of claim 14, wherein the data usage plan is associated with the first computing device and a second computing device.

16. The method of claim 9, wherein the receiving and assigning are performed by an operating system executing on the first computing device.

17. One or more computer storage devices embodying computer-executable components, said components comprising:

an interface component that when executed causes at least one processor to receive a plurality of data transfer requests from one or more applications executing on a first computing device, the plurality of data transfer requests having priority information associated therewith;

a type component that when executed causes at least one processor to classify a plurality of network connections available to the first computing device;

a priority component that when executed causes at least one processor to assign one or more of the plurality of data transfer requests as high priority data transfer requests to a first network connection of the plurality of network connections based on the priority information; and a notification component that when executed causes at least one processor to:
prior to initiating the data transfer request, detect an absence of the first network connection of the plurality of network connections;
determine that all other of the plurality of network connections have data transfer costs that are greater than a data transfer cost associated with the first network connection;
based on the detected absence of the first network connection and determining that all other of the plurality of network connections have data transfer costs that are greater than a data transfer cost associated with the first network connection, determine that none of the other of the plurality of network connections should be used to initiate data transfer requests unless the data transfer requests are high priority;
notify the application associated with the assigned one or more of the plurality of data transfer requests of the detected absence of the first network connection; and
based on the absence of the first network connection and notifying the application associated with the assigned one or more of the plurality of data transfer requests of the detected absence of the first network connection and that the assigned one or more of the plurality of data transfer requests is high priority, re-assigning the assigned one or more of the plurality of data transfer requests to one or more other network connections from the plurality of network connections while the first network connection is absent.

18. The one or more computer storage devices of claim 17, wherein detecting an absence of the first network connection of the plurality of network connections is based on a data threshold associated with the first network connection being exceeded.

19. The one or more computer storage devices of claim 17, wherein the priority component is further programmed to determine a remaining quantity of data available for consumption by the first computing device by comparing cumulative data consumption in a billing period with threshold values defined in the data usage plan.

20. The one or more computer storage devices of claim 17, wherein the priority component further sorts the network connections based on the classifications from the type component.

* * * * *